UNITED STATES PATENT OFFICE.

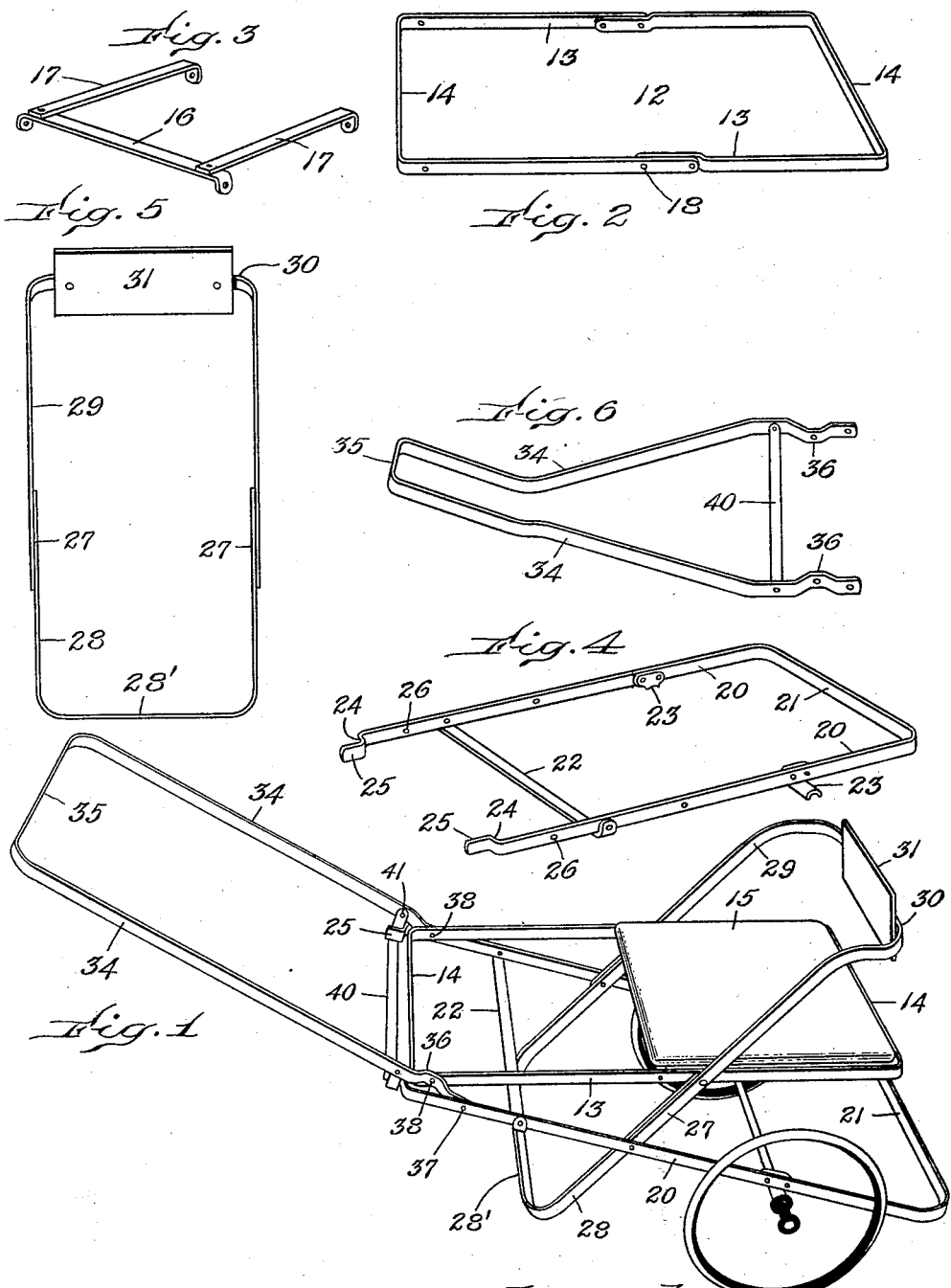

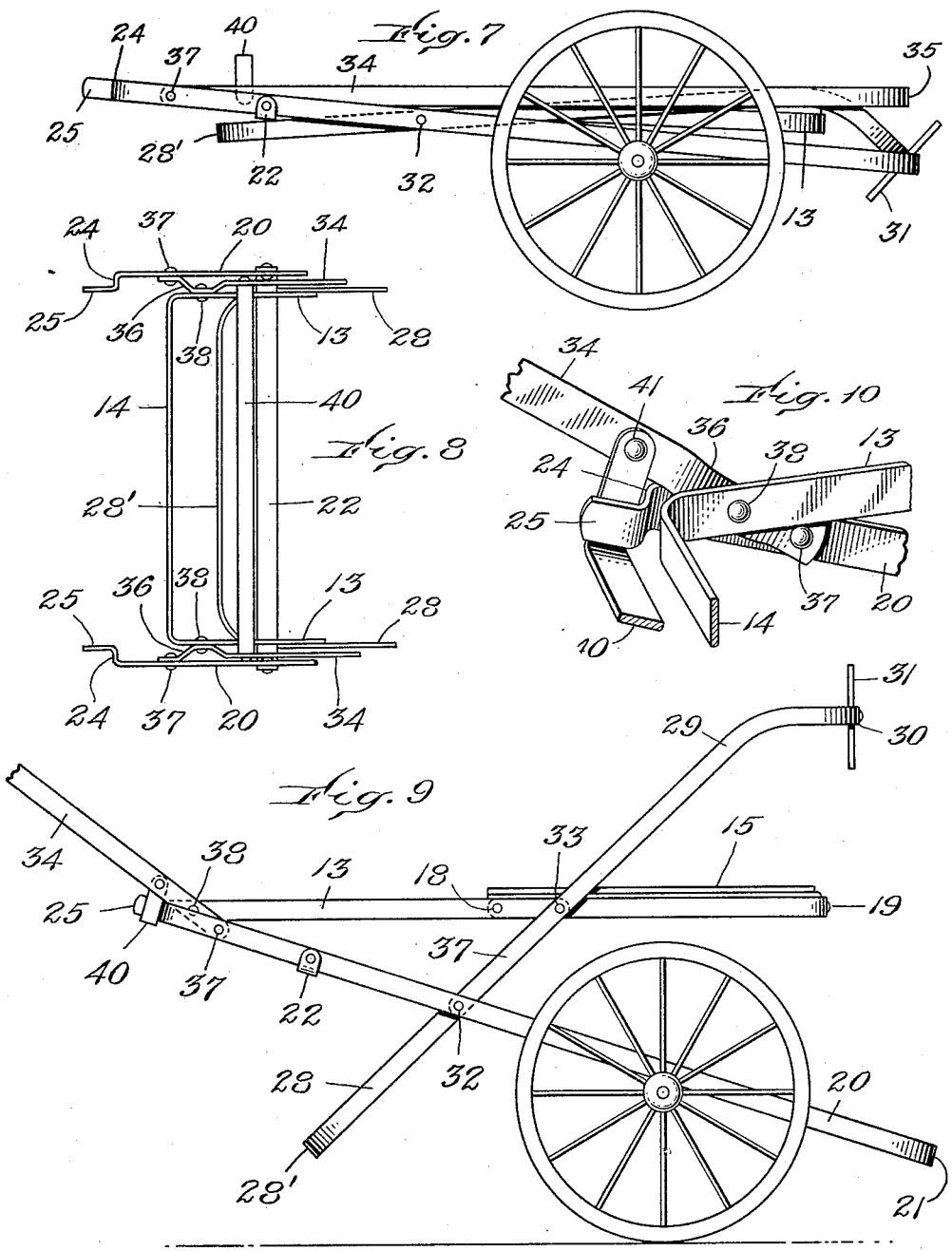

ORA N. TURNER, OF TEMPLETON, MASSACHUSETTS, ASSIGNOR TO BAY STATE METAL WHEEL COMPANY, OF TEMPLETON, MASSACHUSETTS, A CORPORATION OF MAINE.

COLLAPSIBLE VEHICLE.

1,114,314.  Specification of Letters Patent.  Patented Oct. 20, 1914.

Application filed December 26, 1913. Serial No. 808,672.

*To all whom it may concern:*

Be it known that I, ORA N. TURNER, a citizen of the United States, and resident of Templeton, in the county of Worcester and State of Massachusetts, have invented certain new and useful Improvements in Collapsible Vehicles, of which the following is a specification.

This invention relates to collapsible vehicles for children, and especially to two-wheeled vehicles of the sulky type.

Of the accompanying drawings, which illustrate the preferred embodiment of the invention: Figure 1 represents a perspective view of a child's sulky open for use. Fig. 2 represents a perspective view of the body frame. Fig. 3 represents a perspective view of the seat frame which is carried by the body frame. Fig. 4 represents a perspective view of the wheel frame, the same including a back-stand for preventing the sulky from tipping over backward, and a foot-rest. Fig. 5 represents a perspective view of a frame which is pivotally connected to the body frame and wheel frame and which comprises side guards, a seat-back, a foot-rest, and a front-stand. Fig. 6 represents a perspective view of handle bars embodied in a form differing from that shown in Fig. 1. Fig. 7 represents a side elevation of the sulky in collapsed condition. Fig. 8 represents a top plan view of the parts at the left-hand end of Fig. 7. Fig. 9 represents a side elevation of the sulky open for use, a portion of the handle bars being broken away. Fig. 10 represents a perspective view of the coöperating parts of the body frame, wheel frame, and handle bars whereby the vehicle is locked in open position.

The same reference characters indicate the same parts wherever they occur.

The body frame 12, as shown by Fig. 2, is substantially rectangular and is open. This frame, as shown, is made of two U-shaped strips of flat metal, the end portions thereof being lapped and rigidly connected so as to form a rigid unitary frame. The frame has side bars 13, 13, and end bars 14, 14.

The seat 15 is supported by a seat frame (see Fig. 3) which includes a crossbar 16 and longitudinally extending bars 17, 17.

The ends of the bar 16 are turned downwardly and are secured to the side bars 13 of the body frame by suitable fasteners 18. These fasteners serve also to connect the two strips which form the body frame. The forward ends of the bars 17 are attached to the crossbar 16, and the rear ends of the bars 17 are turned downwardly and are secured to the rear crossbar 14 by suitable fasteners 19. The seat 15 rests upon the bars 17 and is secured thereto by suitable fasteners.

The wheel frame is made of a single strip of flat metal which is bent to a U-shape. This frame comprises longitudinal side bars 20, 20, and a rear crossbar 21. The crossbar 21 is arranged to prevent the vehicle from tipping over backward, and it may also serve, if desired, as a foot-rest if the occupant is seated to face to the rear, as when it is desired to push rather than pull the sulky. Near the forward end of the frame the side bars are connected by a crossbar 22 which is rigidly secured and which maintains the side bars parallel. This crossbar is preferably arranged so that it may serve as a foot-rest for the occupant, as is shown by Figs. 1 and 9. Axle fittings 23, 23 are fixed to the side bars 20, 20 and rest upon the axle. Suitable fasteners (not shown) are provided for securing the axle to these fittings. The forward ends of the side bars 20, 20 are bent to form transverse abutments 24, 24 and longitudinal extensions 25, 25 which are adapted to be engaged by a locking bar hereinafter described. The side bars 20, 20 are provided with holes 26, 26 which are occupied by pivots hereinafter described.

The body frame and wheel frame are connected by struts 27, 27 which are afforded by two substantially U-shaped strips 28 and 29, the ends of said strips being lapped, as shown by Fig. 5, and the combined strips forming a substantially rectangular open frame. The sides of the lower strip are connected by a crossbar 28', and the sides of the upper strip are connected by a crossbar 30. The bar 28' is arranged to serve both as a foot-rest for the occupant and as a stand upon which the vehicle may rest when open for use. The crossbar 30 is arranged to act as a seat back and is preferably provided with a piece 31 having a relatively broad bearing for the back of the occupant. The intermediate portions of the strip 29 between the crossbar 30 and struts 27 constitute side guards or arm-rests for the occupant.

By lapping the ends of the bars 28 and 29 at the points which form the struts 27, 27, the body frame is supported by four thicknesses of metal, and a sufficiently strong support for the body frame is thus provided without using stock of excessive thickness at other points. The struts 27 are connected to the wheel frame by pivots 32 and are connected to the body frame by pivots 33, the latter pivots serving also to connect the lapped portions of the strips which form the side bars 13, 13 of the body frame.

The handle bars, as shown by Fig. 1, are formed of a single strip of stock bent to a U-shape, the side portions 34, 34 constituting the handle bars, and the crossbar 35 which connects them constituting the handle. The ends of the side bars 34, 34 are offset, as indicated at 36, in order to provide suitable connection between the side bars of the body frame and the side bars of the wheel frame. Pivots 37 connect the ends of the side bars 34 with the wheel frame, and pivots 38 connect the side bars 34 with the body frame, the bars 34 serving as levers for operating the body frame and wheel frame to collapse and open the vehicle. A crossbar 40 is pivotally connected at its ends to the handle bars 34, 34, and is arranged to coöperate with the extensions 25, 25 to lock the vehicle in open position. The bar 40 is adapted to swing about its pivots 41 to lock or release the extensions 25. When the locking bar is in locking position, its transverse portion underlies the extensions 25, and its upturned portions lie against the transverse offset portions 24, 24 of the body frame. The portions 24 thus determine the locking position of the locking bar. When the handle bars are swung from collapsed position to open position they strike abutments 24 and their movement is thus limited, and when the locking bar 40 is in locking position it holds the handle bars against the abutments 24 so that the parts are held rigidly.

The link connection between the wheel frame and body frame as provided by the handle bars 34 and by the struts 27 causes a bodily movement of the body frame toward and from the wheel frame when the vehicle is collapsed and opened. The distance between the pivots 32 and 33 is materially greater than the distance between the pivots 37 and 38, and consequently the body frame receives a substantial angular movement relatively to the wheel frame in addition to its bodily movement. The angular movement of the struts 27 imparts a substantially vertical edgewise movement to the seat back 31, the seat back being dropped behind the seat when the vehicle is collapsed, as shown by Fig. 7. This movement of the struts also raises the bar 29 when the vehicle is collapsed, and lowers said bar when the vehicle is opened.

When the vehicle is collapsed, a substantial portion of the body frame is inclosed within the wheel frame, these two frames being nested, as it were, when collapsed. Also, the handle bars in the form shown by Fig. 1 inclose the arm-rests or side guards when the vehicle is collapsed, the parts being thus adapted to be folded into most compact relation for carrying or storage. The front crossbar 14 of the body frame forms a convenient handle for carrying the vehicle when collapsed.

Fig. 6 shows handle bars which differ in shape from those shown by Figs. 1 and 7. The operating function and locking function is the same in both forms. The side bars 34, as shown by Fig. 6, converge to shorten the handle or crossbar 35 and are bent to enable the handle portion to lie flat upon the seat when the vehicle is collapsed. In other respects the form shown by Fig. 6 is similar to that shown by the other figures.

I claim:

1. A collapsible vehicle comprising a body frame, a wheel frame, one of said frames being open and adapted to admit the other, and means carried by said wheel frame for supporting said body frame above said wheel frame, said means permitting relative bodily movement of one frame into the other to collapse the vehicle.

2. A collapsible vehicle comprising a body frame and a wheel frame adapted to be nested one within the other, and means carried by said wheel frame for supporting said body frame above said wheel frame, said means permitting relative movement of said frames to nested relation to collapse the vehicle.

3. A collapsible vehicle comprising a body frame, a wheel frame, and two pairs of members carried by said wheel frame for supporting said body frame above said wheel frame, each of said members being pivotally attached to both frames and arranged to cause bodily movement of said body frame toward said wheel frame to collapse the vehicle.

4. A collapsible vehicle comprising a body frame, a wheel frame, and two pairs of members carried by said wheel frame for supporting said body frame above the wheel frame, each of said members being pivotally attached to both frames and the pivotal radii of the members of one pair being unequal to such radii of the others whereby said frames are caused to have relative angular movement and relative bodily movement toward each other when the vehicle is being collapsed.

5. A collapsible vehicle comprising a body frame, a wheel frame, and members carried by said wheel frame for movably supporting said body frame above the wheel frame, each of said members being pivotally attached to both frames and arranged to be inclined in opposite directions from the perpendicular when the vehicle is in operative position and to be substantially parallel to each other when the vehicle is collapsed.

6. A collapsible vehicle comprising a body frame, wheel frame, handle bars pivotally attached to both of said frames at points arranged to cause relative bodily movement of said frames when said handle bars are swung, and struts carried by said wheel frame for supporting said body frame, each of said struts being pivotally connected to both frames to move them angularly toward and from each other.

7. A collapsible vehicle comprising a body frame, a wheel frame, handle bars pivotally attached to both of said frames to move said body frame bodily with relation to said wheel frame, and means arranged to raise and lower said body frame in consequence of such relative bodily movement imparted by said handle bars.

8. A collapsible vehicle comprising a wheel frame, handle bars pivotally attached to said frame to fold therewith, a body frame pivotally attached to said handle bars to be moved thereby, and struts pivotally attached to both of said frames for raising and lowering said body frame in consequence of relative movement imparted by said handle bars.

9. A collapsible vehicle comprising a wheel frame, handle bars pivotally attached to said wheel frame, a body frame pivotally attached to said handle bars to be moved thereby, and means carried by said wheel frame for imparting angular movement to said body frame in consequence of relative movement imparted by said handle bars to raise and lower said body frame.

10. A collapsible vehicle comprising a wheel frame, a body frame, means carried by said wheel frame for raising and lowering said body frame, and a seat back carried solely by said means.

11. A collapsible vehicle comprising a wheel frame, a seat, means carried by said wheel frame for raising and lowering said seat, and a seat back detached from said seat and carried by said means, said means being arranged to move said back edgewise toward and from said seat as said seat moves toward and from said wheel frame.

12. A collapsible vehicle comprising a wheel frame, a seat, a seat back, and means carried by said wheel frame for supporting said seat and seat back independently of each other, said means having folding movement relative to said wheel frame to lower said seat and to lower said seat-back behind said seat.

13. A collapsible vehicle comprising a wheel frame, a seat, a seat back, and means pivotally mounted on said wheel frame for supporting said seat and seat back independently of each other, said means having folding movement relatively to said wheel frame for moving said seat bodily toward said wheel frame and for lowering said seat-back bodily behind said seat.

14. A collapsible vehicle comprising a wheel frame, a seat, means for bodily raising and lowering said seat, and a seat back detached from said seat and carried by said means, said means being arranged to lower said seat-back bodily behind said seat when moved to lower said seat.

15. A collapsible vehicle comprising a wheel frame, a seat, a seat back, and means pivotally mounted upon said wheel frame for supporting said seat back independently of said seat, and for lowering the same behind said seat, said means being arranged to raise and lower said seat.

16. A collapsible vehicle comprising a wheel frame, a seat, means for supporting said seat, said means being adapted to fold to lower said seat, and a seat back detached from said seat and carried by said means, said means being arranged to raise and lower said seat-back relatively to said seat.

17. A collapsible vehicle comprising a wheel frame, a body frame, a seat carried by said body frame, a seat back, and struts pivotally mounted upon said wheel frame for raising and lowering said seat, said struts being pivotally connected to said body frame and having extensions supporting said seat back.

18. A collapsible vehicle comprising a wheel frame, a body frame, a seat carried by said body frame, a seat back, and struts pivotally mounted upon said wheel frame for raising and lowering said seat, said struts being formed by the side portions of a substantially U-shaped strip the transverse portion of which is arranged to support the occupant's back when the seat is raised.

19. A collapsible vehicle comprising a wheel frame, a body frame, a seat carried by said body frame, a substantially U-shaped member the side portions of which are pivotally connected to said frames to raise and lower said seat, the transverse portion of said member being arranged to support the occupant's back when said seat is raised and to drop behind said seat when the seat is lowered.

20. A collapsible vehicle comprising a wheel frame, a body frame, a seat carried by said body frame, and a substantially U- shaped member the side portions of which are pivotally connected to said frames to raise and lower said seat, the transverse portion of said member being arranged to support the occupant's feet when said seat is raised.

21. A collapsible vehicle comprising a wheel frame, a body frame, a seat carried by said body frame, and two substantially U-shaped members the side portions of which are pivotally connected to said frames to raise and lower said seat, the transverse portions of said members being arranged to support the back and feet of the occupant when the seat is raised.

22. A collapsible vehicle comprising a wheel frame, a body frame, a seat carried by said body frame, handle bars pivotally connected to said wheel frame to fold, said handle bars being pivotally connected to said body frame to move the same relatively to said wheel frame, struts pivotally connected to said frames to raise and lower said seat in consequence of relative movement of said body frame, said wheel frame having abutments to determine the operative position of said handle bars, and means for locking said handle bars against said abutments.

23. A collapsible sulky comprising a wheel frame, a body frame, a seat carried by said body frame, struts pivotally connected to said frames for raising and lowering said seat, said struts having extensions arranged to extend close to the ground when said seat is raised to prevent excessive tipping of the sulky, the lower ends of said extensions being movable upwardly as said seat is lowered.

24. A collapsible vehicle comprising two substantially rectangular intersecting frames pivotally connected at their points of intersection, a seat carried by one of said frames, one portion of the other frame being arranged to support the back of the occupant sitting on said seat, and another portion of said other frame being arranged to support the feet of the occupant below said seat, said frames being relatively movable about their pivotal connections to carry said back-supporting portion and foot-supporting portion toward the plane of said seat.

25. A collapsible vehicle comprising two substantially rectangular intersecting frames pivotally connected at their points of intersection, a seat carried by one of said frames, said other frame having a foot-supporting portion and a back-supporting portion, a wheel frame, means movably connecting said wheel frame and seat-supporting frame, and pivotal connections between said other frame and wheel frame, said three frames being adapted to lie in substantially parallel contiguous relation when collapsed and to stand at angles relative to each other when in operative position.

26. A collapsible vehicle comprising a body frame, a seat carried thereby, a wheel frame, a lever pivotally connected to the forward portion of said wheel frame and having a handle at its free end, said handle being arranged to project forwardly from said wheel frame and to swing backwardly and downwardly to collapse the vehicle, pivotal connections between said lever and seat-supporting frame, and struts pivotally connected to said frames and arranged to raise said seat when said lever is swung forwardly and to lower said seat when said lever is swung backwardly.

27. A collapsible sulky comprising a flat wheel-frame, a flat body-frame, a seat carried by said body frame, a hand lever pivotally connected to the forward part of said wheel frame, said lever being arranged to project forwardly from said wheel frame and to be folded backwardly and downwardly into substantially parallel relation with said wheel frame, pivotal connections between said lever and seat-supporting frame, and struts pivotally connected to said frames and arranged to support said seat-supporting frame at an angle to said wheel frame when said lever is in its forward position, and to lower said seat-supporting frame into substantially parallel contiguous relation with said wheel frame when said lever is swung backwardly and downwardly.

28. A collapsible vehicle comprising a wheel frame, a body frame, a seat mounted upon said body frame, pivotal connecting means connecting said frames near the forward ends, and struts pivotally attached to said wheel frame and body frame for supporting the latter in raised position, said struts being movable to permit angular movement of said body frame toward said wheel frame.

In testimony whereof I have affixed my signature, in presence of witnesses.

ORA N. TURNER.

Witnesses:
OTTO W. SIEBERT,
CHARLES A. HARWOOD,
FRED E. DEFINET.

Copies of this patent may be obtained for five cents each, by addressing the "Commissioner of Patents, Washington, D. C."